US006631348B1

United States Patent
Wymore

(10) Patent No.: US 6,631,348 B1
(45) Date of Patent: Oct. 7, 2003

(54) DYNAMIC SPEECH RECOGNITION PATTERN SWITCHING FOR ENHANCED SPEECH RECOGNITION ACCURACY

(75) Inventor: Ben S. Wymore, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 09/634,843

(22) Filed: Aug. 8, 2000

(51) Int. Cl.$^7$ ................................................. G10L 15/20
(52) U.S. Cl. ...................................................... 704/233
(58) Field of Search ............................... 704/226–228, 704/231, 233, 250

(56) References Cited

U.S. PATENT DOCUMENTS

| | | | | |
|---|---|---|---|---|
| 4,897,878 A | * | 1/1990 | Boll et al. | 704/233 |
| 4,905,286 A | * | 2/1990 | Sedgwick et al. | 704/233 |
| 4,933,973 A | * | 6/1990 | Porter | 704/233 |
| 5,293,588 A | * | 3/1994 | Satoh et al. | 704/233 |
| 6,381,569 B1 | * | 4/2002 | Sih et al. | 704/233 |
| 6,529,872 B1 | * | 3/2003 | Cerisara et al. | 704/250 |

* cited by examiner

Primary Examiner—David D. Knepper
(74) Attorney, Agent, or Firm—Pillsbury Winthrop LLP

(57) ABSTRACT

A speech recognition system and method that dynamically switches between reference patterns based on training information produced under different ambient noise levels to enhance speech recognition accuracy, is presented herein. In accordance with an embodiment of the invention, the speech recognition system includes a speech capturing device configured to capture an input utterance and a speech recognition processing mechanism configured to process the input utterances and to generate an identified utterance signal representing a recognized utterance. The system further includes a sensor configured to detect a plurality of ambient noise levels and to supply a detected ambient noise level to the speech recognition processing mechanism and a speech model containing a plurality of stored reference pattern sets representing utterances to be recognized. Each of the stored reference pattern sets are based on training information corresponding to a particular ambient noise levels. As such, in response to receiving the input utterance and detected ambient noise level, the speech recognition processing mechanism switches to the stored reference pattern set corresponding to the detected ambient noise level and determines a recognized utterance by comparing the input utterance to the utterances contained in the corresponding stored reference pattern set. The speech recognition processing mechanism then generates a corresponding identified utterance signal, indicating a recognized utterance, which is applied to related applications to execute predetermined tasks.

25 Claims, 3 Drawing Sheets

DYNAMIC SPEECH RECOGNITION PATTERN SWITCHING FOR ENHANCED SPEECH RECOGNITION ACCURACY

BACKGROUND OF THE INVENTION

1. Field of the Invention

This invention relates to speech recognition systems. Specifically, this invention relates to a novel system and method that enhances the accuracy of speech recognition systems by dynamically switching between reference patterns corresponding to training information produced under different ambient noise levels.

2. Description of Related Art and General Background

Speech recognition systems afford users the capability of performing various tasks on recognition-enabled apparatuses via verbal commands. FIG. 1A (Prior Art) is a high-level functional block diagram depicting a conventional speech recognition system 100. As indicated in FIG. 1, system 100 comprises apparatus 105 and a sound capturing device 115 (e.g., microphone). Apparatus 105 includes a speech recognition processing mechanism 110 for analyzing and processing sounds captured by device 115 and for generating an identified utterance signal $u_i$. Apparatus 105 also includes a statistical speech model 120 comprising a set of reference patterns, and related applications 125 for performing predetermined tasks $t_i$. It is to be noted that apparatus 105 may take the form of a computer, telephone, or any device capable of recognizing and processing verbal commands and executing tasks based on those commands.

FIG. 1B is a high-level flow diagram depicting the general operation of system 200, denoted as process 150. As indicated in FIG. 1B, the sounds or utterances captured by device 115 are received by speech recognition processing mechanism 110 in analog form in block B155. In block B160, mechanism 110 samples and digitizes the analog utterances and assembles the digitized utterances into frames. In block B165, mechanism 110 then extracts acoustical information from the utterance frames by employing any of a number of well-known techniques, including Linear Predictive Coding (LPC) and Filter Bank Analyses (FBA).

In block B170, process 150 endeavors to "recognize" the speech captured device 115 by having mechanism 110 compare the extracted acoustical information to a set of reference patterns stored in speech model 120. The reference patterns comprise a plurality of utterances to be recognized. As such, mechanism 110 determines the best match between the extracted acoustical information and reference patterns in order to identify the utterance received by mechanism 110. In performing the comparisons, mechanism 110 may employ a host of well-known statistical pattern matching techniques, including Hidden Markov Models, Neural Networks, Dynamic Time Warped models, Templates, or any other suitable word representation model. It is to be noted that the plurality of utterances comprising the reference patterns are based, at least in part, on speech training information produced during a training mode. Typically, in training mode, users recite a variety of selected verses into device 115 in order to acclimate mechanism 110 to the user's voice, prior to using system 100. To this end, the selected verses are designed to make the user articulate a wide range of sounds (e.g., diphones, phonemes, allophones, etc.).

Based on the results of the comparison, mechanism 110, in block B175, generates an identified utterance signal $u_i$, indicating the best match between the utterance received by mechanism 110 and the stored reference patterns. Mechanism 110 then supplies signal $u_i$ to applications 125 to perform the predetermined tasks $t_i$.

As noted in FIG. 1A, speech training is performed in the presence of ambient noise level n, and thus, the utterances comprising the stored reference patterns are affected by ambient noise. Given the reliance of the reference patterns on the speech training information, system 100 is particularly susceptible to the contextual nature of speech training. For example, suppose apparatus 105 is a portable computer equipped with applications 125, configured to convert speech into text for word-processing tasks, and mechanism 110, trained within a relatively serene environment (i.e., office). Once removed from the serene environment into a noisier environment, such as, for example, an airplane, mechanism 110 may suffer a significant decrease in accuracy and fidelity. The reasons for such decrease in performance may be two-fold. One reason may be that the ambient noise level n is so high that the sounds captured by the sound capturing device include a blend of speech and background noise, thus making it difficult to distinguish between the two.

Another reason, perhaps more common, is the fact that individuals have a tendency to manipulate their voices so as to ensure that the speech produced is understandable in the presence of substantial ambient noise. In doing so, individuals may, unwittingly, pronounce words with different phonological characteristics (e.g., level, inflections, stress, pitch, and rhythm) than normally produced during quieter conditions. As such, the performance of speech recognition processing mechanism 110, trained and acclimated to a user's pronunciations under certain conditions, may be adversely affected when mechanism 110 operates under different conditions.

Therefore, what is needed is a system and method that dynamically switches between reference patterns based on training information produced under different ambient noise levels to enhance speech recognition accuracy.

DETAILED DESCRIPTION OF THE INVENTION

Figure 1A:
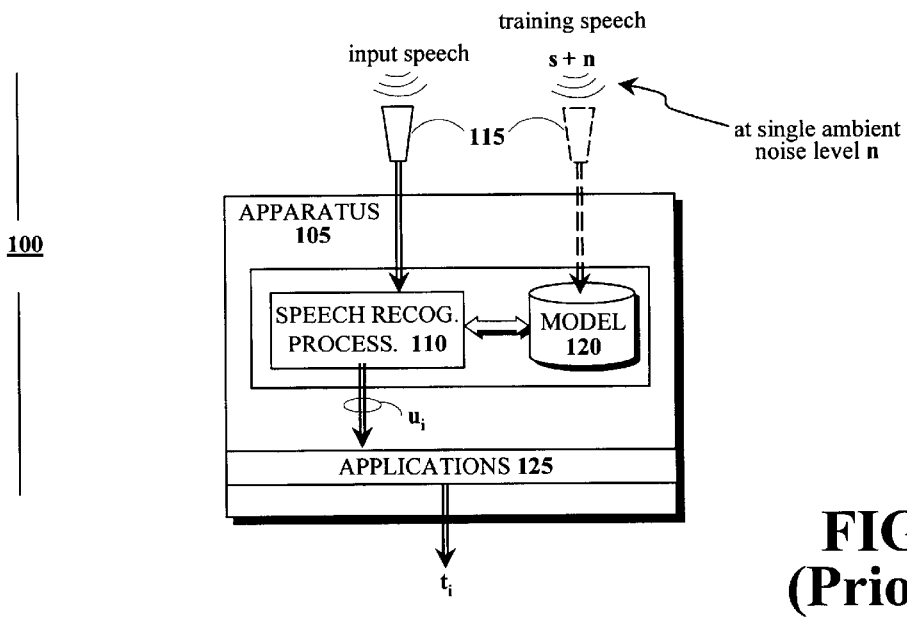
FIG. 1A (Prior Art) depicts a functional block diagram of a conventional speech recognition system.
Figure 1B:
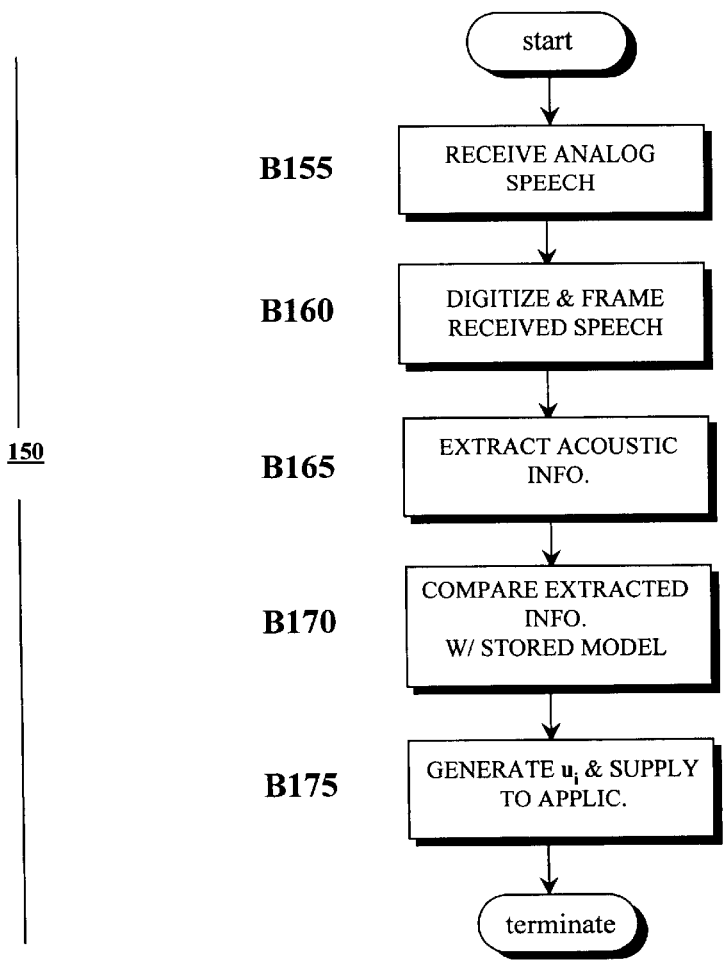
FIG. 1B (Prior Art) depicts a high-level flow diagram of indicating the operation of a conventional speech recognition processing mechanism.

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein.

Moreover, the processes associated with the presented embodiments may be stored in any storage device, such as, for example, a computer system (non-volatile) memory, an optical disk, magnetic tape, or magnetic disk. Furthermore, the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

A speech recognition system that is capable of dynamically switching between reference patterns, as described herein, employs a speech model containing a plurality of stored reference pattern sets. Each stored reference pattern set includes utterances to be recognized and is based on training information produced under a specific ambient noise level. The system further implements a speech recognition processing mechanism capable of processing input utterances and generating an identified utterance signal representing a recognized utterance. As such, the speech recognition processing mechanism, upon receiving an input utterance and a detected ambient noise level, switches to a stored reference pattern set corresponding to the detected ambient noise level and determines a recognized utterance based on the corresponding stored reference pattern set. The speech recognition processing mechanism then generates a corresponding identified utterance signal. In this manner, the disclosed speech recognition system is capable of dynamically switching between the reference pattern sets to more closely match the different phonological attributes produced during various ambient noise levels, thereby enhancing speech recognition accuracy.

Figure 2A:
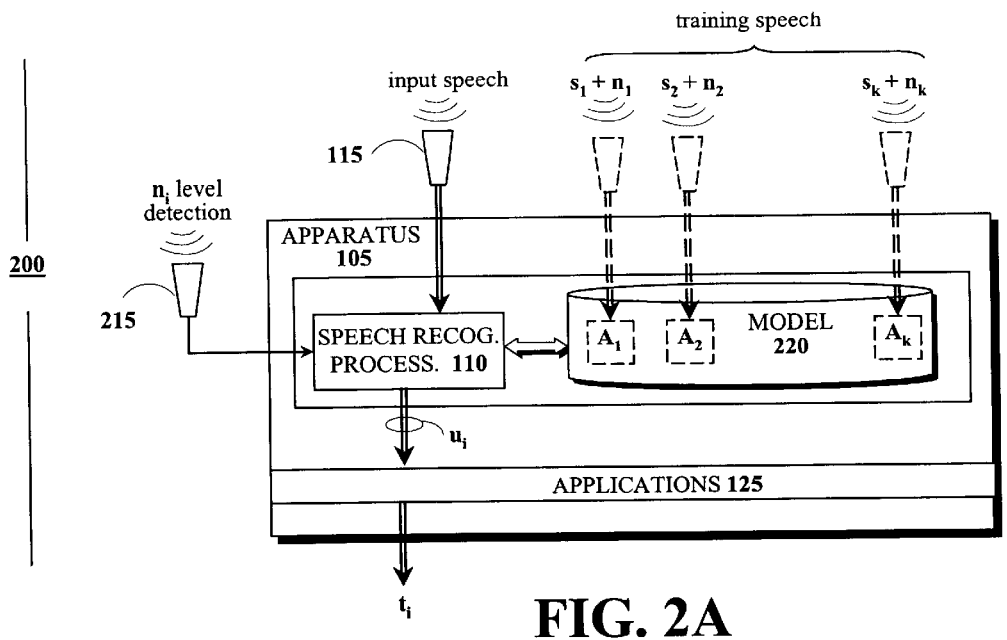
FIG. 2A illustrates a functional block diagram of a speech recognition system, constructed and operative in accordance with an embodiment of the present invention.

FIG. 2A is a functional block diagram depicting system 200, constructed and operative in accordance with an embodiment of the present invention. As indicated in FIG. 2A, system 200 comprises apparatus 105, a sound capturing device 115 (e.g., microphone), and an ambient noise sensor 215. Apparatus 105 includes a speech recognition processing mechanism 110 for analyzing and processing sounds captured by device 115 and for generating an identified utterance signal $u_i$. Apparatus 105 also includes statistical speech model 220 for comparing the captured sounds to a set of stored reference patterns, and related applications 125 for performing predetermined tasks $t_i$. It is to be noted that apparatus 105 may take the form of a computer, telephone, or any device capable of recognizing and processing verbal commands and executing tasks based on those commands.

In an exemplary implementation, speech model 220 includes a plurality of reference pattern sets $A_1-A_k$. Each pattern set $A_i$ corresponds to a particular ambient noise level range $n_i$ and comprises a plurality of utterances to be recognized. The utterances in pattern set $A_i$ are based on training information produced during ambient noise level $n_i$.

Figure 2B:
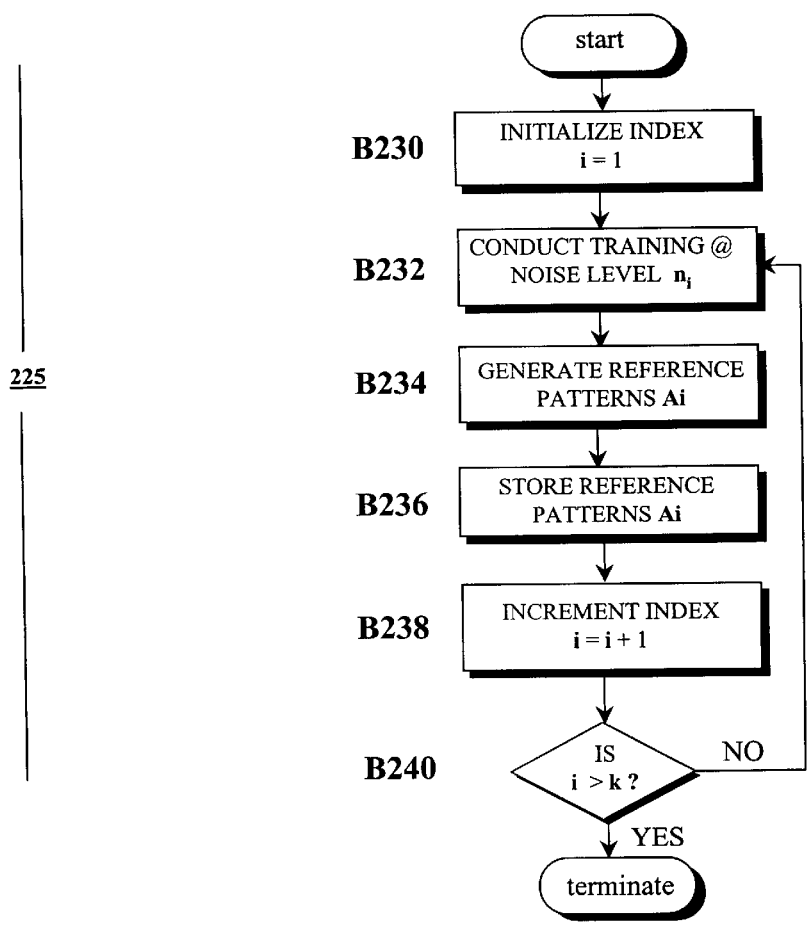
FIG. 2B illustrates a high-level flow diagram of indicating the training sequence of a speech recognition system, constructed and operative in accordance with an embodiment of the present invention.

FIG. 2B depicts a high-level flow diagram illustrating training process 225, which is executed for a plurality of ambient noise level ranges $n_1-n_k$ prior to the run-time operation of system 200. The ambient noise levels $n_1-n_k$ may be simulated by playing pre-recorded sounds at discrete levels or at different levels for predetermined ranges. It will be appreciated that the notation $n_1-n_k$ is used for convenience and may represent, for example, predetermined ambient noise levels ranging from 10–100 dB.

As indicated in block B230, process 225 initializes the noise level range index i. In block B232, process 225 conducts the training sequence for noise level range $n_i$. This is achieved by having a user recite a variety of selected verses into device 115 in the presence of ambient noise level $n_i$ in order to generate training information. The training information will reflect the phonological attributes of the user's recitations for noise level $n_i$.

In block B234, process 225 generates reference patterns $A_i$ for ambient noise level range $n_i$ based on the training information. The generation of reference patterns $A_i$ may be achieved by any well-known technique, including Hidden Markov Models, Neural Networks, Dynamic Time Warped models, any Templates, or any other suitable word representation model.

Upon generating reference patterns $A_i$ for ambient noise level range $n_i$, process 225, in block B236, stores the reference patterns $A_i$ in speech model 220. In block B238, process 225 increments noise level range index i and advances to block B240, where it determines whether it has exceeded the number of allowable noise levels k. If not, process 225 returns back to block B232 in order to conduct the training sequence and generate training information representing the phonological attributes of the user's recitations for the next noise level $n_{i+1}$ as well as reference patterns $A_{i+1}$. If process 225 has exceeded the number of allowable noise levels k, process 225 is terminated.

Figure 2C:
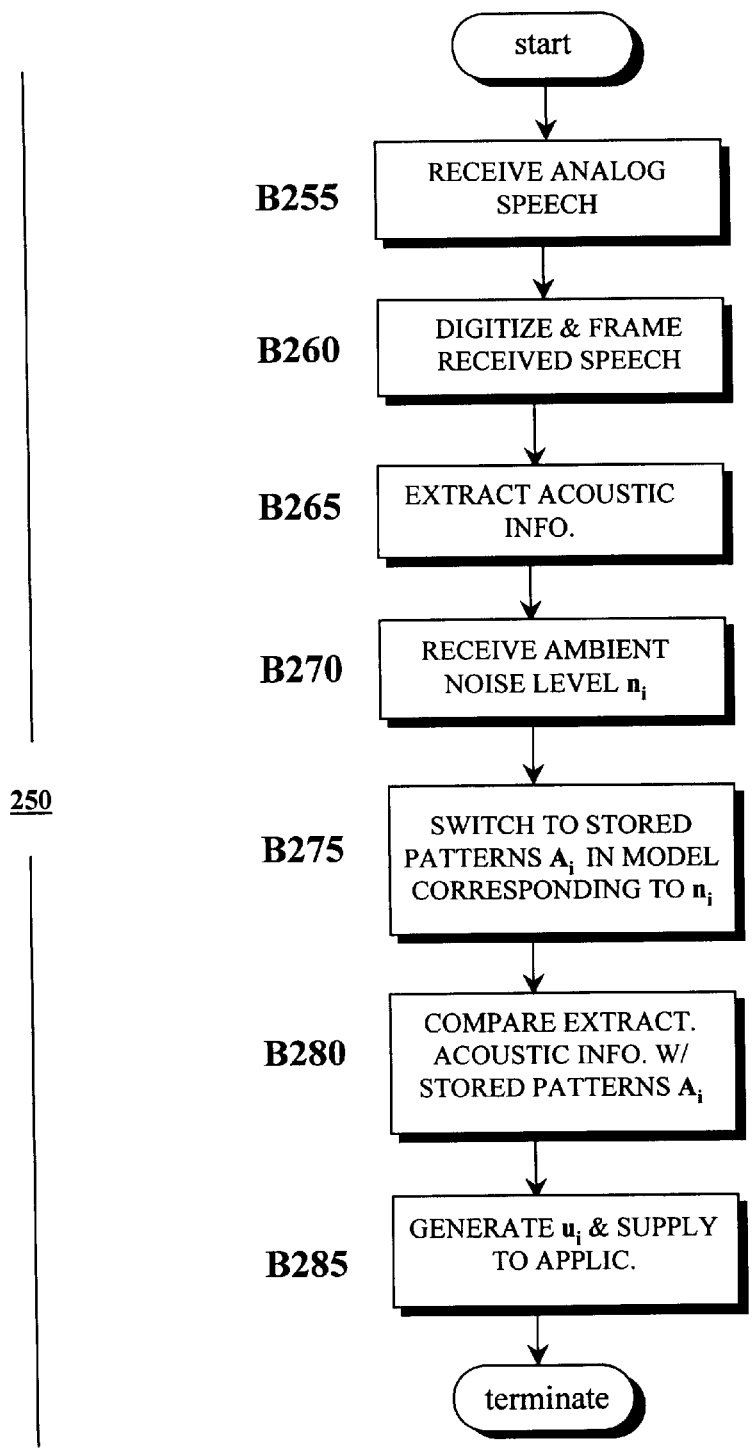
FIG. 2C illustrates a high-level flow diagram of indicating the operation a speech recognition system, constructed and operative in accordance with an embodiment of the present invention.

FIG. 2C depicts a high-level flow diagram illustrating run-time process 250, which is executed during the operation of system 200. As indicated in block B255, process 250 supplies the input utterances captured by device 115 to speech recognition processing mechanism 110 in analog form. After receiving the input utterances, mechanism 110, in block B265, samples and digitizes the analog utterances and assembles the digitized utterances into frames. In block B265, mechanism 110 then extracts acoustical information from the utterance frames by employing any of a number of the well-known techniques noted above.

In block B270, process 250 supplies the ambient noise level range $n_i$ detected by sensor 215 to mechanism 110. In block B275, process 250 dynamically switches to the set of reference patterns $A_i$ stored in model set 120, which correspond to the ambient noise level range $n_i$. Upon switching to the appropriate set of reference patterns $A_i$, process 250, in block B280 attempts to "recognize" the utterances captured by device 115 by having mechanism 110 compare the extracted acoustical information to the set of reference patterns $A_i$. As such, mechanism 110 compares the extracted acoustical information to the reference patterns $A_i$ to determine the best match between the two in order to identify the utterance received by mechanism 110. As noted above, mechanism 110 may employ a host of well-known statistical pattern matching techniques, including Hidden Markov Models, Neural Networks, and Dynamic Time Warped models, templates, or any other suitable word representation model to perform the comparisons.

Finally, based on the results of the comparisons, mechanism 110, in block B285, generates an identified utterance signal $u_i$, indicating the best match between the utterance received by mechanism 110 and the stored reference patterns $A_i$. Mechanism 110 then supplies signal $u_i$ to applications 125 to perform the predetermined tasks $t_i$.

The foregoing description of the preferred embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed is:

1. A speech recognition system comprising:
    a speech capturing device configured to capture an input utterance;
    a speech recognition processing mechanism configured to process said input utterance captured by said speech capturing device and to generate an identified utterance signal representing a recognized utterance;
    a sensor configured to detect a plurality of ambient noise levels and to supply a detected ambient noise level to said speech recognition processing mechanism; and
    a speech model containing a plurality of stored reference pattern sets representing utterances to be recognized, each of said stored reference pattern sets based on training information corresponding to a select one of said ambient noise levels;
    wherein, in response to receiving said input utterance and said detected ambient noise level, said speech recognition processing mechanism switches to a stored reference pattern set corresponding to said detected ambient noise level, determines a recognized utterance based on said corresponding stored reference pattern set, and generates a corresponding identified utterance signal.

2. The speech recognition system of claim 1, wherein said training information is generated by articulating a plurality of training utterances for each of said ambient noise levels during a training mode.

3. The speech recognition system of claim 2, wherein each of said stored reference pattern sets are constructed by applying at least one of statistical pattern matching techniques and word representation models based on said training information for each of said ambient noise levels.

4. The speech recognition system of claim 3, wherein said speech recognition processing mechanism determines said recognized utterance by,
    comparing said input utterance to said utterances to be recognized included in said stored reference pattern set corresponding to said detected ambient noise level, and
    ascertaining the closest match between said input utterance and said utterances to be recognized.

5. The speech recognition system of claim 4, further including an application configured to receive said identified utterance signal and to execute a predetermined task based on said identified utterance signal.

6. A speech recognition method comprising:
    capturing an input utterance and supplying said input utterance to a speech recognition processing mechanism;
    detecting an ambient noise level and supplying said detected ambient noise level to said speech recognition processing mechanism; and
    constructing a plurality of stored reference pattern sets representing utterances to be recognized, each of said stored reference pattern sets based on training information corresponding to a particular ambient noise level,
    wherein, in response to receiving said input utterance and said detected ambient noise level, said speech recognition processing mechanism switches to a stored reference pattern set corresponding to said detected ambient noise level, determines a recognized utterance based on said corresponding stored reference pattern set, and generates a corresponding identified utterance signal.

7. The speech recognition method of claim 6, wherein said training information is generated by articulating a plurality of training utterances for each of said ambient noise levels during a training mode.

8. The speech recognition method of claim 7, wherein each of said stored reference pattern sets are constructed by applying at least one of statistical pattern matching techniques and word representation models based on said training information for each of said ambient noise levels.

9. The speech recognition method of claim 8, wherein said speech recognition processing mechanism determines said recognized utterance by,
    comparing said input utterance to said utterances to be recognized included in said stored reference pattern set corresponding to said detected ambient noise level, and
    ascertaining the closest match between said input utterance and said utterances to be recognized.

10. The speech recognition method of claim 9, further including,
    executing, by an application, a predetermined task based on said identified utterance signal received from said speech recognition processing mechanism.

11. A computer-readable medium encoded with a plurality of processor-executable instruction sequences for:
    capturing an input utterance and supplying said input utterance to a speech recognition processing mechanism;
    detecting an ambient noise level and supplying said detected ambient noise level to said speech recognition processing mechanism; and
    constructing a plurality of stored reference pattern sets representing utterances to be recognized, each of said stored reference pattern sets based on training information corresponding to a particular ambient noise level,
    wherein, in response to receiving said input utterance and said detected ambient noise level, said speech recognition processing mechanism switches to a stored reference pattern set corresponding to said detected ambient noise level, determines a recognized utterance based on said corresponding stored reference pattern set, and generates a corresponding identified utterance signal.

12. The computer-readable medium of claim 11, wherein said training information is generated by articulating a plurality of training utterances for each of said ambient noise levels during a training mode.

13. The computer-readable medium of claim 12, wherein each of said stored reference pattern sets are constructed by applying at least one of statistical pattern matching techniques and word representation models based on said training information for each of said ambient noise levels.

14. The computer-readable medium of claim 13, wherein said speech recognition processing mechanism determines said recognized utterance by, comparing said input utterance to said utterances to be recognized included in said stored reference pattern set corresponding to said detected ambient noise level, and ascertaining the closest match between said input utterance and said utterances to be recognized.

15. The computer-readable medium of claim 14, further including, executing, by an application, a predetermined task based on said recognized utterance signal received from said speech recognition processing mechanism.

16. A speech recognition system comprising:

a speech capturing device configured to capture an input utterance;

a speech recognition processing mechanism configured to digitize said input utterance captured by said speech capturing device, to assemble said digitized input utterance into frames, to extract acoustical information from said frames, and to generate an identified utterance signal representing a recognized utterance;

a sensor configured to detect a plurality of ambient noise levels and to supply a detected ambient noise level to said speech recognition processing mechanism; and a speech model containing a plurality of stored reference pattern sets representing utterances to be recognized, each of said stored reference pattern sets based on training information corresponding to a select one of said ambient noise levels;

wherein, in response to receiving said input utterance and said detected ambient noise level, said speech recognition processing mechanism switches to a stored reference pattern set corresponding to said detected ambient noise level, determines a recognized utterance based on said corresponding stored reference pattern set, and generates a corresponding identified utterance signal.

17. The speech recognition system of claim 16, wherein said training information is generated by articulating a plurality of training utterances for each of said ambient noise levels during a training mode.

18. The speech recognition system of claim 17, wherein each of said stored reference pattern sets are constructed by applying at least one of statistical pattern matching techniques and word representation models based on said training information for each of said ambient noise levels.

19. The speech recognition system of claim 18, wherein said speech recognition processing mechanism determines said recognized utterance by, comparing said acoustical information corresponding to said input utterance to said set of characteristics included in said stored reference pattern set corresponding to said detected ambient noise level, and ascertaining the closest match between said acoustical information and said set of characteristics.

20. The speech recognition system of claim 19, further including an application configured to receive said identified utterance signal and to execute a predetermined task based on said identified utterance signal.

21. A speech recognition method comprising:

capturing an input utterance and supplying said input utterance to a speech recognition processing mechanism;

digitizing said input utterance by said speech recognition processing mechanism;

assembling said digitized input utterance into frames by said speech recognition processing mechanism;

extracting acoustical information from said frames by said speech recognition processing mechanism;

detecting an ambient noise level and supplying said detected ambient noise level to said speech recognition processing mechanism; and constructing a plurality of stored reference pattern sets representing utterances to be recognized, each of said stored reference pattern sets based on training information corresponding to a particular ambient noise level, wherein, in response to receiving said input utterance and said detected ambient noise level, said speech recognition processing mechanism switches to a stored reference pattern set corresponding to said detected ambient noise level, determines a recognized utterance based on said corresponding stored reference pattern set, and generates a corresponding identified utterance signal.

22. The speech recognition method of claim 21, wherein said training information is generated by articulating a plurality of training utterances for each of said ambient noise levels during a training mode.

23. The speech recognition method of claim 22, wherein each of said stored reference pattern sets are constructed by applying at least one of statistical pattern matching techniques and word representation models based on said training information for each of said ambient noise levels.

24. The speech recognition method of claim 23, wherein said speech recognition processing mechanism determines said recognized utterance by, comparing said acoustical information corresponding to said input utterance to said characteristics included in said stored reference pattern set corresponding to said detected ambient noise level, and ascertaining the closest match between said acoustical information and said characteristics.

25. The speech recognition method of claim 21, further including, executing, by an application, a predetermined task based on said identified utterance signal received from said speech recognition processing mechanism.

* * * * *